Patented Jan. 3, 1939

2,142,937

UNITED STATES PATENT OFFICE 2,142,937

PRODUCTION OF HIGHER BOILING HYDROCARBONS FROM OLEFINES

Richard M. Deanesly and Evan Clifford Williams, Berkeley, and Leo V. Steck, Piedmont, Calif., assignors to Shell Development Company, San Francisco, Calif., a corporation of Delaware No Drawing. Original application August 4, 1934, Serial No. 738,536. Divided and this application September 10, 1938, Serial No. 229,292

5 Claims. (Cl. 260—683)

This invention relates to a process for the production of valuable higher boiling hydrocarbons from olefines. It is also concerned with the production of valuable compositions of matter capable of use as fuels, as components of fuel mixtures, as lubricants, as raw material for resin production, etc.

More specifically, this invention is concerned with the production of iso-octane and/or other hydrocarbons boiling within the gasoline range or above.

Our invention may be practiced with mixtures of hydrocarbons containing olefines or with individual olefines. As suitable starting material we may employ hydrocarbons derived from mineral oils as petroleum, shale oil, and the like, or from natural gas or from coal, peat and like carboniferous natural materials. The olefines present in such starting material may be of natural occurrence, the result of catalytic dehydrogenation, distillation, vapor or liquid phase cracking or other pyrogenetic treatment. Thus we may employ any suitable hydrocarbon mixture regardless of its source or of its olefine content.

We may proceed in several ways, depending on the product or products desired. For example, if individual or isomeric branched chain paraffins are desired, we may start with a suitable hydrocarbon fraction consisting essentially of, or predominating in, hydrocarbons containing the same number of carbon atoms to the molecule. If a mixture of higher boiling products is desired, a suitable hydrocarbon mixture of non-isomeric olefines, whether contained therein initially or produced by destructive methods such as by distillation, decomposition, cracking, etc., may be used. Thus we may start either by selectively absorbing a tertiary olefine or mixture of tertiary olefines from their hydrocarbon fraction such as butane-butene, pentane-pentene, hexane-hexene, etc. cut, or by selectively absorbing a mixture of tertiary olefines without first fractionating, or partly fractionating the complex hydrocarbon mixture. Alternatively, we may absorb tertiary and secondary-base olefines together from their fractions or mixtures but, in this procedure, control of the polymerization of the tertiary olefines is difficult so that we prefer to absorb and polymerize the tertiary- and secondary-base olefines separately.

Secondary-base olefines are here defined as those olefines, both iso and normal, which yield secondary derivatives, while tertiary-base olefines are those iso-olefines which yield tertiary derivatives.

We have discovered that iso-octane and other valuable paraffin compounds and mixtures may be simply and cheaply prepared by the selective and controlled polymerization of olefines and hydrogenation of the resulting polymers. Thus one distinguishing feature of our invention is the polymerization of olefines or olefine mixtures of substantially the same reactivity; for example, tertiary-base olefines are polymerized without conversion of less reactive olefines, secondary-base olefines are treated in accordance with their respective reactivities, ethylene is treated alone, etc. As a result, the polymerization of these olefines may be, for the first time, readily controlled to yield products of definite composition, for example, preponderantly dimers or trimers, etc., or mixtures of predictable proportions. By hydrogenation of these polymers, new compositions of matter are obtained, particularly suited for use as stable components or substitutes of fuels and lubricants.

For the purpose of affording a clear understanding of our invention, but without imposing limitation thereon, it will be described with more particular reference to the treatment of the olefines present in cracked petroleum oils which comprise a mixture of various unsaturated compounds, together with saturated hydrocarbon material. The latter may be considered as inert in our process. Straight run petroleum products are also useful, although usually containing lower olefine percentages.

The desired hydrocarbon fraction or mixture, in the gaseous, vaporous, or liquid state—the liquid state promoting increased surface contact—is contacted with a polymerizing agent in any suitable manner, with or without pressure. For example, resort may be had to the agitation of the two agents in a common vessel or to countercurrent flow and the like. Suitable polymerizing agents are inorganic acids of which, $H_2SO_4$, $HCl$, $H_3PO_4$, $H_4P_2O_7$ and $H_3AsO_4$ are typical, or organic acids as

its homologues, analogues, and the like or acid liquors such as are obtained by the absorption of olefines, of the same or less reactivity than the olefine or olefines being treated, in mineral acting acids such as the above, or solutions or suspensions of acid acting salts as $Ag_2SO_4$, $PbSO_4$, $BiOCl$, $Cu_3(PO_4)_2$ and the like. Preference is given polymerization agents of this type as they may also serve as media for the extraction, absorption or solution of the olefines. However, other agents not adapted to such a function may, in certain instances be desirable as solid salts as Friedel-Crafts type reagents such as AlCl₃, ZnCl₂, MgCl₂ and the like. Such more reactive polymerizing agents require careful control of the reaction but are nevertheless advantageous, especially in the treatment of fractions from which the more reactive olefines have been removed. Such removal may be carried out by absorption in the above suggested media or by scrubbing with a chilled absorbent wash oil, for removal of amylenes and butylenes, for example, whereby the constituents recovered may be converted into valuable products in accordance with the present invention, or in other ways with other dispositions of the products.

Following the removal of the tertiary base olefines by absorption in H₂SO₄, for example, the secondary base olefines may then be absorbed in fresh acid in accordance with our invention for separate polymerization.

The time of contact required for absorption and/or polymerization of the olefine or olefines is dependent on the character of the olefines involved and the nature of concentration of the polymerizing agent used, as well as on the temperature at which the operation is carried out. For the production of substantially pure products, pure isomeric mixtures or mixed polymers thereof, it is necessary that the time of contact and temperature of the operation be so adjusted to the character and quantity of the more reactive olefine or olefines present and the activity of the polymerizing agent used that negligible conversion of the less reactive olefines occurs.

It is to facilitate this selectivity of the procedure that we prefer to use a polymerizing agent such as H₂SO₄ and the like above mentioned, in which the desired olefine or olefines of approximately the same reactivity may be absorbed. The polymerization of the absorbed olefines may then be completed under the conditions best adapted to their polymerization rate to yield a preponderance of dimer, trimer, or other forms or mixtures as desired.

In such cases the absorption of the desired olefine or olefines is effected by adjustment of the strength of the acid used, to the previously mentioned controlling factors. Thus lower temperatures and/or a higher rate of thruput may be used with stronger acids, whereas with relatively weak acids higher temperatures may be maintained with or without a decreased rate of olefine thruput. The polymerization is then effected by subjecting the absorbed olefine to more drastic treatment as by further heating, etc. The polymerization of secondary base olefines is more difficult than the polymerization of the tertiary base olefines and usually requires higher temperatures and/or more concentrated acid or the use of more reactive polymerizing agents. Increased reaction time promotes the formation of higher polymers as does increased temperature. The latter, however, may tend to produce undesirable reactions with the acid present. Additional polymerizing agents may advantageously be added to promote the formation of higher polymers, as for example, by increasing the concentration of the acid being used or by the addition of other agents such as AlCl₃ and the like. In the latter case the operation is preferably carried out in steps, the product of the acid polymerization, most preferably rectified, being separately treated under carefully controlled temperature conditions, room temperature for example, with the more active catalyst.

The hydrogenation of the resulting desired polymer or polymeric mixture is effected by any conventional procedure, the conditions being so adjusted that substantial decomposition is not produced. Suitable active catalysts are metals of the 1st, 6th, and 8th groups of the periodic table, either alone or in combination with each other or other metals or with inert supports, for example, copper, tungsten, platinum black, copper chromite, copper and nickel with zinc or cobalt, nickel on pumice or alumina, etc. The oxides, sulfides and phosphates of these metals and particularly those of the 6th group may also be used, as chromic oxide gel, molybdenum phosphate, and the like. Any suitable source of hydrogen may be employed. In addition to the economic advantage of using dilute by-product hydrogen, such gases are particularly useful for temperature control of the hydrogenation reaction in the vapor phase.

The temperature and pressure necessary for the hydrogenation are dependent both upon the activity of the catalyst employed and the nature of the polymer. Thus with colloidal palladium, for example, active hydrogenation of diisobutylene can be effected at room temperature, whereas the more common types of nickel catalyst require a temperature of over 100° C. and pressure of 10 atmospheres or more. Furthermore with triisobutylene even higher temperatures are required under comparable conditions to make the hydrogenation rate practical. The upper temperature limit, as mentioned above, is fixed by the tendency of the particular polymer involved to decompose which in our process is to be avoided.

The following detailed example illustrates one modification of our invention as applied to the production of substantially pure iso-octane. But it will be understood that many widely different embodiments of this invention may be made without departing from the spirit thereof, and that by suitable modification of operating conditions a great variety of other compounds and mixtures may be prepared.

For the production of iso-octane (2,2,4 trimethyl pentane) a hydrocarbon fraction containing substantially only compounds of 4 carbon atoms to the molecule is preferred. The presence of compounds containing fewer carbon atoms to the molecule does not materially effect the procedure, however, but the presence of olefines of a greater number of carbon atoms to the molecule tends to give lower yields of iso-octane as a result of the formation of mixed polymers and requires more exacting fractionation of the resulting products.

The desired butane-butene fraction, having for example, a boiling range of about −10° C. to about plus 5° C., obtained by distillation or condensation or both will normally contain: Normal and iso-butane, butene 1 and butene 2, isobutylene, and traces of diolefines such as butadiene.

In the practice of our invention for the production of substantially pure iso-octane from such starting material we preferably employ H₂SO₄ of about 60 to 75% strength as it apperently yields the best results. The rate of thruput of butane-butene mixture is about 0.6 gallon per minute per gallon of reaction space where the isobutylene content is about 18% by weight employing 70% of H₂SO₄. Under these conditions about 0.5 gallon of acid are used per gallon of butane-butene mixture. The temperature is preferably maintained in the above example at about 50° C. It is to be understood that the above conditions illustrate one combination of these factors only and that within wide limits changes made in any one of them may be compensated for by changes in the others and the same approximate result attained. Furthermore, with fractions containing hydrocarbons of different reactivity modifications apparent to the chemist will be necessary.

Under the above conditions the isobutylene is selectively absorbed by the $H_2SO_4$ and may be drawn off for completion of the polymerization thereof, leaving a butane-butene mixture which is eminently suitable for the preparation of secondary butyl alcohol, or by suitable modification of the methods of the present invention, for the production of isomeric octanes.

For completion of the polymerization of the isobutylene the acid solution thereof is heated, either in a closed vessel with stirring, or while flowing through a coil, to about 80 to 110° C. until polymerization is practically complete. In batch operation in an autoclave this will be indicated by a decrease in the isobutylene pressure from about 150 to about 10 pounds per square inch. A bath of boiling water as heating medium provides a simple means for carrying out this operation. Other means and other temperatures may be employed, but it has been found that lower temperatures require longer time of treatment and ultimately lead to great increases in the proportion of triisobutylene and indeed serve as a ready means for preparing this compound whereas for the production of iso-octane, the product desired is the dimer. A temperature as high as 140° C. also increases the yield of triisobutylene, but at the same time leads to the formation of $SO_2$ and malodorous compounds by the interaction of $SO_2$ and/or $H_2SO_4$ with the polymers, which we prefer to avoid.

The rate of thruput of the acid-isobutylene mixture depends upon the composition of the mixture and the rate of heat transfer provided. In continuous operation using a coil heater, when the capacity of the apparatus is exceeded, it is shown by increased amounts of unpolymerized isobutylene in the crude polymer or, in extreme cases, loss of gaseous isobutylene.

Good results have been obtained with a copper coil of cross-section such that it handles 50 to 80 gallons of isobutylene-acid mixture per hour per square inch internal cross-section and of a length sufficient to provide ½ square foot of surface per gallon of feed per hour. In this way polymer yields of 90% of the isobutylene input are obtainable. Under the above conditions the crude polymer contains from 60 to 70% diisobutylene by volume, the remainder being principally trimer. At some sacrifice of capacity, the diisobutylene content may be increased to 75 to 80% by the addition of water to dilute the feed to the polymerizing coil. This dilution water is of the order of about 10% by weight of the acid input (i. e., on a hydrocarbon free basis.)

The capacity of a coil of a given size can be increased by providing an unheated insulated waiting tank preferably in the form of a fairly short, broad tower into which the contents of the polymerizing coil discharge at the bottom and bubble up through acid which tends to settle back. The mixture of polymer and acid is then conducted through cooling coils to a separator where the acid is withdrawn for recycling and the crude polymer collected in a storage tank over a layer of alkali to remove any traces of dissolved acid.

Rectification of the crude polymer containing, under the conditions of preparation described, diisobutylene and triisobutylene in an approximate ratio of 3:1 is a simple operation. The diisobutylene is recovered as the fraction boiling between 99 and 105° C.

The hydrogenation of the diisobutylene may readily be carried out in a steel autoclave equipped with a stirrer and the necessary valves to permit maintenance of an atmosphere of hydrogen not only during the time of reaction, but also during charging and discharging. At the conclusion of each run the active nickel catalyst, present in an amount about equal to 5% by weight of the diisobutylene to be hydrogenated, is allowed to settle. The clear iso-octane is drawn off as completely as possible, preferably with the aid of a filter, and the autoclave recharged with fresh diisobutylene for the next run. The course of the reaction may be followed by withdrawing samples from the vapor phase (to prevent a removal of catalyst), condensing the hydrocarbons present, and determining their bromine number or refractive index. We have found that the hydrogenation of diisobutylene of sufficiently low sulfur content proceeds smoothly in the apparatus described at about 150° C. and about 225 pounds per square inch pressure, and is complete in about 15 minutes. Pressures above about 225 lbs./sq. in. produce very little change in the reaction rate, while those as low as 175 lbs./sq. in. show distinctly low rates. In the region between 105 and 165° C. the rate of hydrogenation is increased by about $\frac{1}{10}$ per degree increase in temperature. The hydrogenation may be carried out in the vapor phase as by passing diisobutylene vapor and hydrogen through a tube containing active nickel supported on pumice at a temperature of about 200 to 300° C. and under a pressure of about 150 to 250 lbs./sq. in. Difficulty has been encountered, however, in preventing the development of excessively high temperatures due to the heat produced by the reaction. Inert gases such as nitrogen and the like may be present in the hydrogenating system.

The preferred nickel catalyst is prepared by slowly heating technical nickelous formate suspended in oil to 300° C. and holding the temperature at that point for three hours, an atmosphere of hydrogen being maintained at all times. The mixture is cooled and the nickel settled by centrifuging.

Several procedures are available for the preparation of diisobutylene of the requisite sulfur purity. We prefer to carry out any purification required, using the original butane-butene mixture as with this material sulfur removal may be easily accomplished by caustic scrubbing (44° to 50° Bé. NaOH) in the gas phase. It has been found that the subsequent treatment carried out in the presence of $H_2SO_4$, as outlined above, causes no increase in sulfur content. By suitable fractionation of the crude diisobutylene polymer, the sulfur content may also be reduced to safe limits. The excess sulfur may alternatively be eliminated from the polymer by suitable chemical treatment as by refluxing with $H_2O_2$ or other oxidizing agents, washing with $Hg(NO_3)_2$ and the like, or by absorption using silica gel or active nickel, etc. None of these alternatives have been found as satisfactory or as economical as the preferred treatment of the starting material.

By following the preferred procedure outlined above substantially theoretical yields of iso-octane having the following characteristics may be obtained:

| | |
|---|---|
| Boiling point °C | 99.2–99.4 |
| Specific gravity 20/4 | 0.6917 |
| Index of refraction $N_D^{20}$ | 1.3886 |
| Bromine number | 0.1±0.1 |

Among the many obvious modifications of our invention may be mentioned, by way of further illustration, but without limitation thereto, the preparation of higher boiling paraffin compounds from the dimers and trimers, separately and mixed, of secondary base olefines and other tertiary base olefines. Some of the products so obtainable are shown in the following table, together with the source of hydrocarbon fraction of petroleum oil from which they may be produced, and some remarks regarding their preparation.

boiling range heretofore produced. Furthermore, this product is obtained in substantially theoretical yield. While such products of our invention may be advantageously used without admixture or blending with other hydrocarbons, nevertheless, we regard the products when so mixed or blended as within the scope of our invention. Thus, for example, a blend of the above-mentioned iso-octane and isododecane mixture with an iso-pentane fraction, recoverable by repeated distillation of petroleum oils, forms another high octane value fuel. The same product may also be obtained by inclusion of isopropyl ethylene in the mixed polymers before hydrogenation.

It is thus seen that our invention provides a commercially available method for producing a wide variety of valuable branched chain paraffin hydrocarbons containing tertiary carbon atoms either as substantially pure chemical individuals or isomeric mixtures. These products are producible in high yield from cheap widely distributed raw materials by a simple procedure which

| Hydrocarbon fraction | Selectively absorbed component | Hydrogenation product | | | Remarks |
|---|---|---|---|---|---|
| | | Dimer | Trimer | Mixture | |
| Gaseous fraction boiling below −20° C. | Ethylene | N-butane | 3 methyl pentane | | Least reactive of the olefines. Requires very drastic acid treatment and high temperature. |
| | Propylene | 2 methyl pentane | 2,4 dimethyl heptane. | Isohexane and isononane. | May be selectively removed by treatment with 80–100% H₂SO₄ at 50–30° C. or by fractionation. |
| Butane-butene | Isobutylene | 2,2,4 trimethyl pentane. | Isododecane (chiefly 2,2,4,4,6 pentamethyl heptane). | Iso-octane and iso-dodecane. | Trimer most easily recovered as azeotrope B. P. 98° C. (approximately 51 to 53% triisobutylene and 49 to 47% water by volume). Hydrogenation of triisobutylene is much slower under comparable conditions than diisobutylene. Composition of mixture can be varied between iso-octane 30 to 90% and isododecane 70 to 10% by control of conditions of polymerization. |
| | Butene 1 and butene 2. | Mixture-3 methyl heptane and 3,4 dimethyl hexane. | Mixed dodecanes | Mixed isomers of iso-octane and isododecane. | Requires use of stronger acid and higher temperature with or without decreased rate of throughput as compared with tertiary base olefines. |
| Pentane-pentene | Tertiary base olefines (trimethyl ethylene and unsymmetrical methyl ethyl ethylene). | Mixture 3,3,5 trimethyl heptane and 3,3,4,5 tetramethyl hexane. | Mixed penta-decanes. | Mixed isomeric decanes and pentadecanes. | These materials are of only slightly lower reactivity than isobutylene and when treated under the same conditions give about the same results as regards degree of polymerization, etc. |
| | Isopropylethylene. | 2,3,6 trimethyl heptane. | Mixed isopentadecanes. | | Isopropylethylene preferably isolated by fractionation but may also be treated with pentene 1 and pentene 2 by the described procedure. |
| | Secondary base olefines (pentene 1 and pentene 2). | Mixture of 5 isomeric decanes. | Mixed penta-decanes. | | Require slightly more drastic conditions than are necessary with butene 1 and butene 2. |

Only the products of the dimers and trimers of petroleum fractions boiling below 50° C. are illustrated in the table, but it is evident that higher polymers of these and of higher boiling fractions may be similarly prepared by the proper choice of polymerization agent, temperature and time of treatment.

As a result of the control and limitation of the polymerization made possible by our invention, these products are of definite composition and of much greater value and usefulness than the mixtures of graduated composition produced by former processes. For example, the iso-octane, isododecane mixture obtainable by hydrogenating the crude polymer obtained as an intermediate in the preparation of iso-octane as described, is a fuel boiling within the gasoline range, of much higher anti-knock rating than any paraffin hydrocarbon mixture of similar makes these products available, for the first time, in a valuable form at prices which permit their commercial use.

Two particularly novel high octane fuels which are of high volatility and desirable for high speed internal combustion engines, particularly planes, are fuel containing:

| | |
|---|---|
| 15% isopentane | 15% isopentane |
| 85% iso-octane | 65% iso-octane |
| Boiling range 31° to 99° C. (760 mm.) | 20% isododecane |
| Specific gravity .682 (20°/20° C.) | Boiling range 43° to 178° C. (760 mm.) |
| Aniline equivalent +16.±1 and | Specific gravity .707 (20°/20° C.) |
| | Aniline equivalent +17 ±1 |

While we have in the foregoing described in some detail the preferred embodiment of our invention and some variants thereof, it will be understood that this is only for the purpose of making the invention more clear and that the invention is not to be regarded as limited to the details of operations described, nor is it dependent upon the soundness or accuracy of the theories advanced as to the advantageous results attained.

This application is a division of our copending application Serial No. 738,536, filed August 4, 1934.

We claim as our invention:

1. A process for preparing selected valuable higher boiling hydrocarbons from mixtures comprising olefines of different orders of reactivity including tertiary olefines which comprises preliminarily removing substantially all of the tertiary olefine content thereof, polymerizing a major portion of the less reactive olefine content and hydrogenating at least part of the resulting polymerization product.

2. A process for preparing selected higher boiling hydrocarbons which comprises preliminarily removing substantially all of the tertiary olefine content from a hydrocarbon mixture comprising significant quantities of secondary and tertiary olefines, polymerizing a major portion of the remaining secondary olefine content and hydrogenating at least part of the resulting polymerization product.

3. A process for preparing selected higher boiling hydrocarbons from a hydrocarbon mixture comprising secondary and tertiary olefines in the liquid phase which comprises preliminarily removing substantially all of the tertiary olefine content thereof, polymerizing a substantial portion of the secondary olefine content thereof and hydrogenating at least part of the resulting polymerization product.

4. A process of preparing selected higher boiling hydrocarbons from a hydrocarbon mixture containing ethylene, secondary and tertiary olefines which comprises substantially removing the secondary and tertiary olefine content, polymerizing a substantial part of the residual olefinic content and hydrogenating at least part of the resulting polymerization product.

5. A process for preparing selected higher boiling hydrocarbons from a hydrocarbon fraction predominating in hydrocarbons of the same number of carbon atoms to the molecule and containing secondary and tertiary olefines which comprises preliminarily removing substantially all of the tertiary olefine content thereof, polymerizing a major portion of the secondary olefinic content thereof and hydrogenating at least part of the resulting polymerization product.

RICHARD M. DEANESLY.
EVAN CLIFFORD WILLIAMS.
LEO V. STECK.